Albert A. Ashton
INVENTOR.

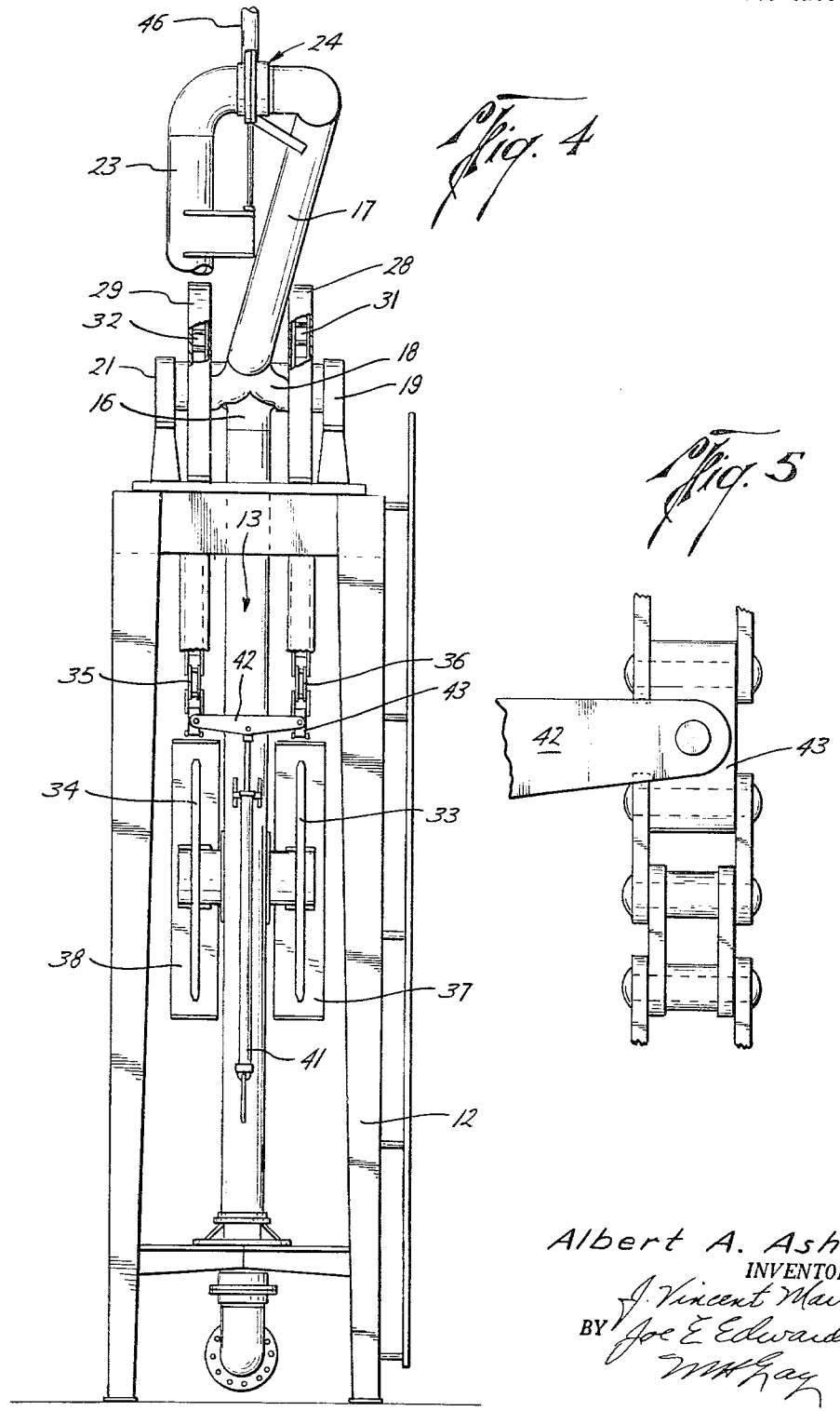

United States Patent Office 3,236,259
Patented Feb. 22, 1966

3,236,259
COUNTERBALANCED LOADING DEVICE
Albert A. Ashton, Dallas, Tex., assignor to The Youngstown Sheet and Tube Company, Youngstown, Ohio, a corporation of Ohio
Filed Dec. 18, 1962, Ser. No. 245,569
7 Claims. (Cl. 137—615)

This invention relates to a device for loading and unloading liquids, and more particularly to a device for transferring liquids between stationary tanks and movable tanks such as marine vessels.

In loading liquids in marine vessels, provision must be made for changing elevation of the marine vessel as its load increases. Provision must also be made to permit small movements of the vessel in any direction due to movement of the water, and particularly due to wake from other vessels. It is conventional to provide loading arms for this service which swing from one end and are provided with a plurality of swivels to permit free movement of the vessel in any direction, and to permit loading with the vessel at various relative elevations.

Due to the tremendous moment of force set up about the pivot point of swivelled arm loading devices, it is customary to counterbalance the weight of the loading arm so that the entire loading arm may be permitted to move free about the pivot or swing point during maneuvering. This counter-balance also reduces the amount of weight which the vessel must support during the loading operation, and thereby reduces wear on the triple swivel normally found at the free end of the outer loading arm.

As the amount of counterbalancing force necessary changes with the outlet end of the loading arm in different positions, a simple 1 to 1 ratio counterbalance is not satisfactory. One of the problems in providing a suitable counterbalance is that the arm in fully extended loading position should be counterbalanced as much as possible, and yet in the retracted position which is normally approximately 180° from the loading position, the amount of counterbalance should be much less so that the weight of the loading arm will maintain it in retracted position under all weather conditions. To achieve these objectives, it is thus apparent that a much larger counterbalance is required when the arm is extending approximately horizontal in loading position and when the arm is extending approximately horizontal in retracted position.

Many different structures have been suggested for varying the amount of counterbalancing force exerted. See for instance Patents Nos. 2,365,821; 2,927,607; and 2,980,150.

The use of cams to vary the moment arm through which a counterweight exerts its force requires the use of ropes, cables, or the like, which can come loose, wear or part unexpectedly. As the weights involved are tremendous, extensive damage is possible and serious injuries to personnel may occur.

It is an object of this invention to provide a loading device for liquids in which the ratio of movement of the loading arm and the effective moment arm of the counterweight may be other than 1 to 1, and in which the likelihood of failure of the counterbalancing system is very small.

Another object is to provide a fluid loading device in which the loading arm can swing through a vertical arc of approximately 180° and in which the loading arm will be substantially counterbalanced in the loading position, and will be only partially counterbalanced when the loading arm is swung to the fully retracted position in which the likelihood of failure of the counterbalancing system is very small.

Another object is to provide a loading device in which movement of the fluid loading arm and counterbalance is other than on a 1 to 1 ratio, and in which the counterbalance and loading arm are directly tied together through mechanical linkage.

Another object is to provide a counterbalance system for a fluid loading device in which the counterbalance is mechanically attached to the loading arm and in which the loading arm is substantially conuterbalanced in the more common loading positions.

Other objects, features and advantages of the invention will be apparent from the drawings, the specification and the claims.

In the drawings wherein like reference numerals indicate like parts, and wherein an illustrative embodiment of this invention is shown;

FIGURE 4 is a front elevational view of the loading device with a portion of the outer arm omitted to better illustrate the device; and, FIGURE 5 is a fragmentary view on an enlarged scale of a portion of the equalizer crossbar shown in FIGURE 4.

Figure 1:
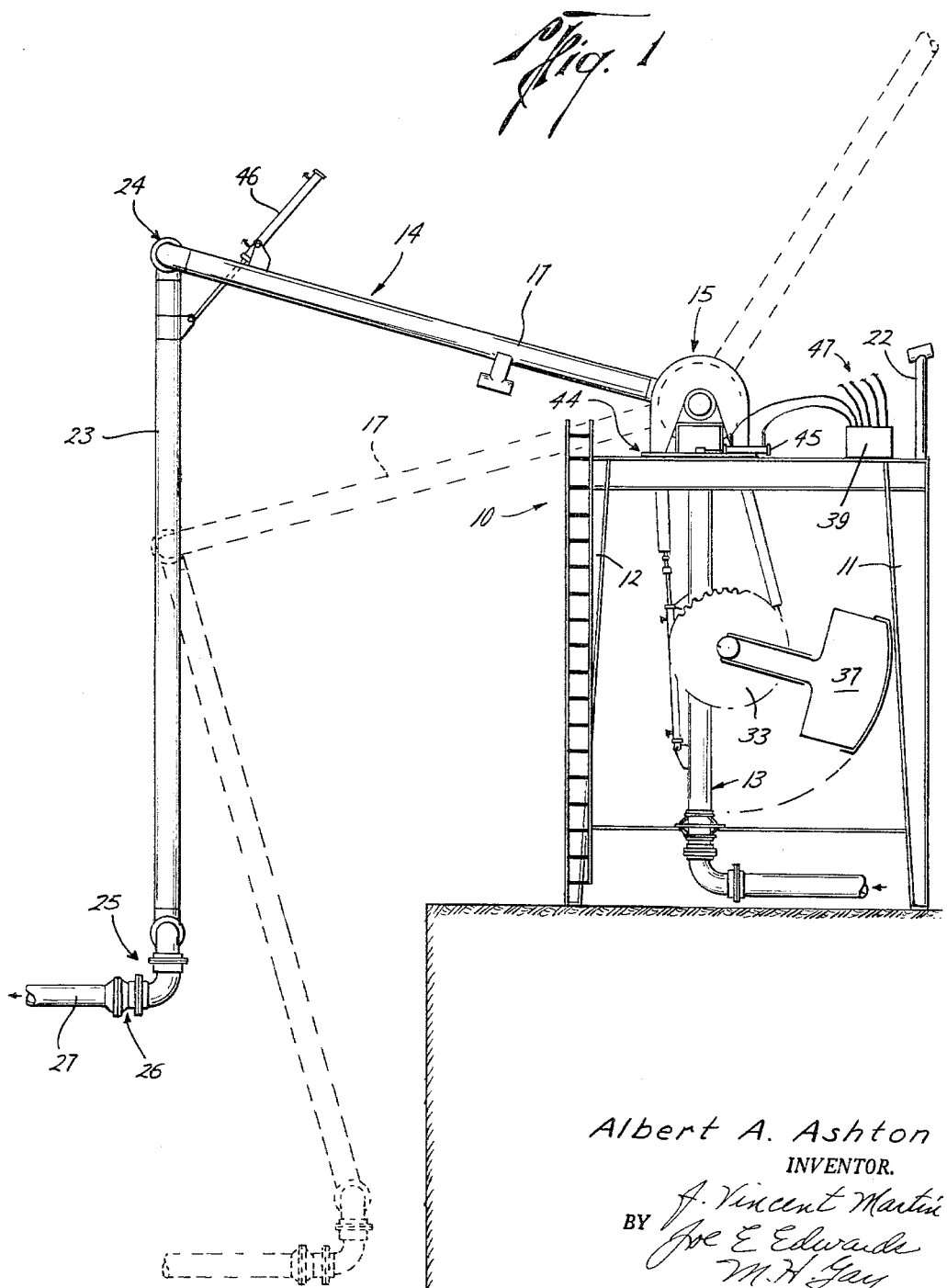
FIGURE 1 is a view in side elevation of a fluid loading device constructed in accordance with this invention.

The loading device includes a platform indicated generally at 10 which may be supported by a plurality of legs such as shown at 11 and 12. The platform may be located on land adjacent a waterway for loading marine vessels, or it may be located on one marine vessel for transferring liquids to another marine vessel.

A supply pipe indicated generally at 13 has its inlet end connected to a source of liquid, not shown. Its outlet end is connected to the loading arm indicated generally at 14 through a swivel assembly indicated generally at 15.

The swivel assembly forms no part of this invention and may take any desired form in which liquids can be transferred from the supply pipe 13 to the loading arm 14 while permitting the loading arm to swing through a substantial arc. In the illustrated form the supply pipe terminates in a T fitting 16 and the inlet end of the inner arm 17 of the loading arm is provided by a Y-shaped fitting 18 which is received over the extremities of the run of the T and rotate thereabout.

The Y-shaped member 18 of the inner end of inner arm 17 is supported on trunnions 19 and 21 and provides for swinging movement of the loading arm through an arc of substantially 180°. The arm 14 is mounted for movement from the dotted line position shown in FIGURE 1 in which the inner arm 17 is depressed to its lowest position. The mounting provides for swinging of the arm 17 about a horizontal axis to the position shown in FIGURE 2 in which the inner arm 17 makes an angle of about 15° with the horizontal.

A saddle assembly 22 provides a support for the loading arm when in retracted position and supports a portion of the weight thereof.

The tubular loading arm 14 includes an outer arm 23 swivelled to inner arm 17 by the swivel assembly indicated generally at 24. At the outlet end of the loading arm a triple swivel indicated generally at 25 provides for movement of the coupling 26 at the outlet end of the loading arm in any plane to facilitate connection of the loading arm to the inlet pipe of the vessel being loaded represented by the pipe 27.

It is desirable that the vessel being loaded support as little of the weight of the loading arm as practical.

As these arms are on the order of thirty feet in length and relatively large in diameter, it will be appreciated that their weight is considerable even when constructed of light weight material. The problem is further complicated by the changing level of the inlet connection 27. Different vessels will have their inlet connections at different elevations and the height of the inlet will vary considerably as the vessel is loaded and sinks lower into the water. With the above problems in mind, it is desirable that the weight of the loading arm be approximately counterbalanced with the arm in as many loading positions as possible. Obviously a single counterbalance cannot approximately counterbalance the arm in all positions, as the outer arm 23 in some instances may extend vertically and in other instances horizontally. In the most common loading position the vessel will be positioned a constant distance from the platform but will have various elevations relative to the platform. Thus, a preferred counterbalance would be effective to approximately counterbalance the weight of the arm 14 regardless of the angles of the inner and outer arms 17 and 23 with the outlet of the outer arm in any position in a vertical plane which is spaced from the swivel 15 by a distance approximating the length of inner arm 17.

A counterbalance is provided meeting the above criteria by providing a pair of wheel members, one of which is rotated by the loading arm and one of which carries the counterbalance, connected together at the desired ratio. In the illustrated embodiment wheel means are carried by the loading arm 14 within housings 28 and 29. Wheel means 31 is mounted in housing 28 and wheel means 32 is mounted in housing 29. The wheel means is provided in pairs for balance of the system. The wheel means 31 and 32 are non-rotatably mounted on the loading arm for rotation therewith.

A second wheel means is provided by a pair of wheels 33 and 34. The second wheel means is mounted for rotation below the platform 10.

In order to connect the wheel means 33–34 for rotation with the wheel means 31–32 through a fixed mechanical linkage, the wheel means are preferably provided by sprockets over which chains 35 and 36 are trained. Of course, other means of interlocking the peripheries of the wheel means will immediately suggest themselves to those skilled in the art.

Counterbalances 37 and 38 are mounted on the wheel means 33 and 34 respectively. As best shown in FIGURE 1, the counterbalance is positioned on the wheel means 33–34 to provide maximum counterbalance when the inner arm 17 extends approximately in the horizontal loading position.

In order to accomplish the desired counterbalancing of the loading arm, the wheel means carried by the loading arm is smaller than the wheel means supporting the counterbalance. The ratio of size of the several wheel means will determine the degree of counterbalance provided at various positions of the inner loading arm 17. This ratio will be between 1 to 1 and 2 to 1. Preferably this ratio is approximately 1.4 to 1.

Figure 2:
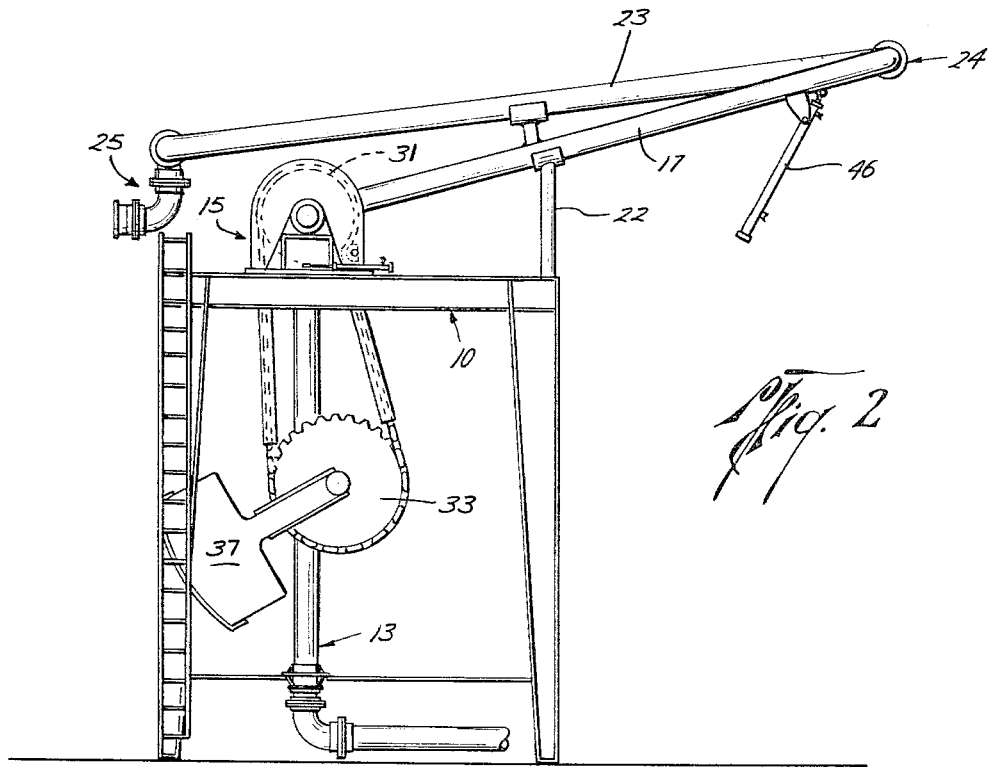
FIGURE 2 is a view similar to FIGURE 1 with the loading arm shown in retracted position.
Figure 3:
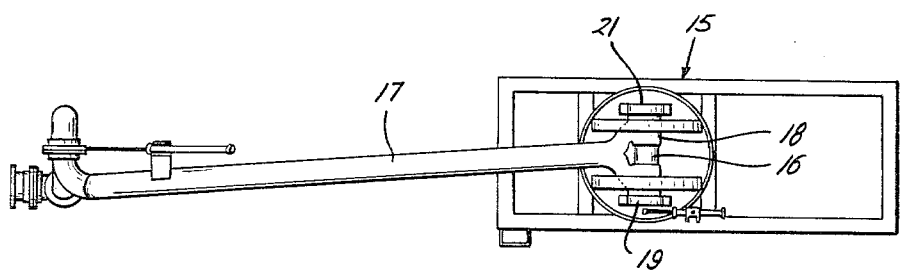
FIGURE 3 is a top view of the loading device shown in loading position.

It will be noted that with the ratio of approximately 1.4 to 1 the weight of the loading arm will be approximately counterbalanced with the outlet of the loading arm positioned in a plane spaced from the swivel 15 by approximately the length of inner arm 17. This ratio will also position the counterweight so that it will counterbalance a portion of the weight of the loading arm when in retracted position as shown in FIGURE 2.

Control of the loading arm is provided by a hydraulic system in which hydraulic fluid is directed to control pistons from a hydraulic control system indicated generally at 39. A hydraulic actuator 41 carries an equalizer bar 42 which is attached to a link 43 of each chain 35 and 36. As hydraulic fluid is fed to the actuator 41, the chain is forced to move by the equalizer bar to rotate the loading arm about the swivel support 15. The swivel support 15 is mounted on a turn table indicated generally at 44 which is rotated by the hydraulic actuator 45. A hydraulic actuator 46 is also provided for swinging the outer arm 23 of the loading arm in the desired amount. Suitable hydraulic lines connect the hydraulic actuators 41, 45 and 46 to the control box 39. Only fragments of these lines are shown at 47, as these actuators form no part of the invention. In like manner, the details of the turn table are not shown, as turn tables are conventional and form no part of this invention.

From the above it will be apparent that any desired range of counterbalance can be readily provided for by the selection of the ratio of the wheel carried by the loading arm and the wheel on which the counterbalance is supported. If desired, the liquid load in the loading arm may be considered, and a portion of this liquid load counterbalanced when the loading arm is in loading position. By counterbalancing a portion of the liquid load, the amount of weight supported by the marine vessel is reduced and a safety factor in the event of breaking of the connection with the vessel is introduced. For instance, if the connection 26, or a portion of the swivel 25, fails, the liquid load will tend to be reduced on the loading arm due to free escape of the liquid. Also, an immediate alarm would cause the delivery pump to be shut off. By over-counterbalancing the loading arm, the resulting tendency would be for the arm to kick up if a rupture occurred. This would take the arm into a non-dangerous position and the possibilities of injury to personnel would be greatly reduced.

By providing the direct mechanical connection between the counterbalance and the loading arm, the possibility of failure of a cable or the like is eliminated, thus removing a possible source of trouble in use of the loading device.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A loading device comprising,
a platform,
a tubular loading arm,
means on the platform mounting the loading arm for swinging movement about one end of the arm,
first wheel means connected to the loading arm and mounted for rotation in response to vertical swinging movement of the loading arm,
second wheel means rotatably mounted on said platform,
means including teeth on the wheel means interlocking the peripheries of said first and second wheel means with a ratio between 1 to 1 and 2 to 1 and rotating the second wheel means in response to rotation of the first wheel means, and
a counterbalance mounted on the second wheel means for counterbalancing at least a portion of the weight of the loading arm.

2. A loading device comprising,
a platform,
a tubular loading arm,
means on the platform mounting the loading arm for swinging movement about one end of the arm,
first wheel means connected to the loading arm and mounted for rotation in response to vertical swinging movement of the loading arm,
second wheel means rotatably mounted on said platform,
means including teeth on the wheel means interlocking the peripheries of said first and second wheel means with a ratio of approximately 1.4 to 1 and rotating the second wheel means in response to rotation of the first wheel means, and
a counterbalance mounted on the second wheel means, for counterbalancing at least a portion of the weight of the loading arm.

3. A loading device comprising, a platform, a tubular loading arm having inner and outer arms swivelled together, means on the platform mounting the loading arm for swinging movement about one end of the inner arm, first wheel means connected to the loading arm and mounted for rotation in response to vertical swinging movement of the loading arm, second wheel means rotatably mounted on said platform, means including teeth on the wheel means interlocking the peripheries of said first and second wheel means with a ratio of between 1 to 1 and 2 to 1 and rotating the second wheel means in response to rotation of the first wheel means, and a counterbalance mounted on the second wheel means and approximately counterbalancing the loading arm with the free end of the outer arm positioned in a vertical plane spaced from the mounting means by a distance equal to the length of the inner arm.

4. A loading device comprising, a platform, a tubular loading arm having inner and outer arms swivelled together, means on the platform mounting the loading arm for swinging movement about one end of the inner arm, first wheel means connected to the loading arm and mounted for rotation in response to vertical swinging movement of the loading arm, second wheel means rotatably mounted on said platform, means including teeth on the wheel means interlocking the peripheries of said first and second wheel means with a ratio of approximately 1.4 to 1 and rotating the second wheel means in response to rotation of the first wheel means, and, a counterbalance mounted on the second wheel means and approximately counterbalancing the loading arm with the free end of the outer arm position in a vertical plane spaced from the mounting means by a distance equal to the length of the inner arm.

5. A loading device comprising, a platform, a tubular loading arm having inner and outer arms swivelled together, means on the platform mounting the loading arm for swinging movement about one end of the inner arm from a loading position in which the inner arm extends substantially horizontally through substantially more than a quadrangle to a retracted position in which the weight of the arm will maintain it in retracted position, a support saddle underlying the inner loading arm in retracted position and supporting a portion of the weight of the arm, first wheel means connected to the loading arm and mounted for rotation in response to vertical swinging movement of the loading arm, second wheel means rotatably mounted on said platform, means including teeth on the wheel means interlocking the peripheries of said first and second wheel means and rotating the second wheel means in response to rotation of the first wheel means, and a counterweight mounted on the second wheel means and extending horizontally therefrom when the inner loading arm extends approximately horizontally in loading position and approximately counterbalancing the loading arm, the diameter of said wheels having a ratio which will position the counterbalance in a position to counterbalance a portion of the weight of the loading arm when in retracted position.

6. The loading device of claim 5 wherein said ratio is between 1 to1 and 2 to 1.

7. The loading device of claim 5 wherein said ratio is approximately 1.4 to 1.

References Cited by the Examiner

UNITED STATES PATENTS

| | | | |
|---|---|---|---|
| 829,609 | 8/1906 | Steinke | 137—615 X |
| 1,530,050 | 3/1925 | Johnson | 137—615 |
| 2,250,227 | 7/1941 | Kiel | 137—615 |
| 2,722,230 | 11/1955 | Toussaint | 137—615 X |
| 3,073,343 | 1/1963 | Mowell | 137—615 |
| 3,085,593 | 4/1963 | Sorensen | 137—615 |

ISADOR WEIL, *Primary Examiner.*

WILLIAM F. O'DEA, *Examiner.*